(12) United States Patent
Kwon et al.

(10) Patent No.: US 11,508,543 B2
(45) Date of Patent: Nov. 22, 2022

(54) FUSE BOX FOR BATTERY OF VEHICLE

(71) Applicants: HYUNDAI MOTOR COMPANY, Seoul (KR); KIA MOTORS CORPORATION, Seoul (KR); Korea Electric Terminal Co., Ltd., Incheon (KR); Hyundai Mobis Co., Ltd., Seoul (KR)

(72) Inventors: Beom Joo Kwon, Suwon-si (KR); Mi Ok Kim, Seongnam-si (KR); Jae Seung Lee, Seoul (KR); Jin Woong Lee, Incheon (KR)

(73) Assignees: HYUNDAI MOTOR COMPANY, Seoul (KR); KIA MOTORS CORPORATION, Seoul (KR); KOREA ELECTRIC TERMINAL CO., LTD., Incheon (KR); HYUNDAI MOBIS CO., LTD., Seoul (KR)

( * ) Notice: Subject to any disclaimer, the term of this patent is extended or adjusted under 35 U.S.C. 154(b) by 81 days.

(21) Appl. No.: 17/035,302

(22) Filed: Sep. 28, 2020

(65) Prior Publication Data
US 2021/0280383 A1    Sep. 9, 2021

(30) Foreign Application Priority Data
Mar. 3, 2020    (KR) ........................ 10-2020-0026600

(51) Int. Cl.
*H01H 85/20*    (2006.01)
*H02G 3/08*    (2006.01)

(52) U.S. Cl.
CPC ...... *H01H 85/2045* (2013.01); *H01H 85/205* (2013.01); *H02G 3/086* (2013.01); *H01H 2085/208* (2013.01); *H01H 2085/209* (2013.01)

(58) Field of Classification Search
CPC ............. H01H 85/2045; H01H 85/205; H01H 2085/2075; H01H 2085/208; H01H 2085/209; H02G 3/086
See application file for complete search history.

(56) References Cited

U.S. PATENT DOCUMENTS

| 6,030,257 | A | * | 2/2000 | Furuya | ............... | H01H 85/2045 439/620.26 |
| 8,878,059 | B2 | | 11/2014 | Makino | | |
| 9,819,168 | B2 | | 11/2017 | Shiraki | | |
| 2002/0134572 | A1 | * | 9/2002 | Matsumura | .......... | H01H 85/044 174/66 |
| 2007/0289765 | A1 | * | 12/2007 | Lammens, Jr. | ........ | H02G 3/086 174/50 |
| 2008/0242150 | A1 | * | 10/2008 | Chikamatsu | ........... | H01H 85/54 337/237 |

(Continued)

*Primary Examiner* — Jacob R Crum
(74) *Attorney, Agent, or Firm* — Morgan, Lewis & Bockius LLP

(57) ABSTRACT

A fuse box for a battery of a vehicle includes: a lower housing having a space in which a fuse is housed and a bus bar for electrically connecting the battery and the fuse is seated; a plate-shaped upper housing having a through hole formed at a central portion thereof and a first extending portion extending upward along a circumference of the through hole, where the upper housing is assembled on an upper side of the lower housing; and a fuse cover that is coupled to an upper side of the upper housing to cover the fuse exposed through the through hole of the upper housing.

16 Claims, 17 Drawing Sheets

(56) References Cited

U.S. PATENT DOCUMENTS

| | | | |
|---|---|---|---|
| 2008/0261459 A1* | 10/2008 | Choi | H01R 9/2466 439/709 |
| 2009/0033453 A1* | 2/2009 | Deno | H01H 85/547 337/205 |
| 2015/0042442 A1* | 2/2015 | Garascia | H01H 85/547 337/201 |
| 2018/0228047 A1* | 8/2018 | Ota | H05K 7/1432 |
| 2019/0067886 A1* | 2/2019 | Jung | H01R 13/688 |

* cited by examiner

FUSE BOX FOR BATTERY OF VEHICLE

CROSS REFERENCE TO RELATED APPLICATION

The present application claims the benefit of priority to Korean Patent Application No. 10-2020-0026600, filed on Mar. 3, 2020 in the Korean Intellectual Property Office, the entire contents of which is incorporated herein by reference.

TECHNICAL FIELD

The present disclosure relates to a fuse box for a battery of a vehicle.

BACKGROUND

In general, a vehicle is equipped with various electric devices for the operation of the vehicle itself and the convenience of passengers, and these electrical devices are electrically connected to a battery and a generator to receive power required for the operation and are operated by a switch operation of a driver and electronic control of a controller.

In addition, fuses are provided on power supply lines of electric devices to be heated and short-circuited when current flows excessively due to abnormality or overload of an electrical system, thereby protecting the electric devices, and are integrated/installed in a fuse box for convenience of management.

On the other hand, in an electric vehicle equipped with a high voltage battery, the fuse box in which the fuse of the high voltage battery is mounted should be considered to meet design conditions such as an optimal size to reduce cost and weight in design, the minimum number of openings that can easily replace the fuse in the event of a failure but improve water tightness, securing robustness against external impact, electromagnetic shielding, and easy workability inside a battery.

However, the existing fuse box has not been designed in consideration of all of the above-described design conditions. Accordingly, there is a need to develop a technology for a fuse box for a battery of a vehicle that has a simple structure in consideration of the above-described design conditions, improves the water tightness, and secures robustness and electromagnetic shielding performance.

The above information disclosed in this Background section is to aid in the understanding of the background of the present disclosure, and should not be taken as acknowledgement that this information forms any part of prior art.

SUMMARY

An object of the present disclosure is to provide a fuse box for a battery of a vehicle that has a simple structure, improves water tightness, and secures robustness and electromagnetic shielding performance.

According to an exemplary embodiment of the present disclosure, a fuse box for a battery of a vehicle includes: a lower housing having a space in which a fuse is housed and a bus bar for electrically connecting the battery and the fuse is seated; a plate-shaped upper housing having a through hole formed at a central portion thereof and a first extending portion extending upward along a circumference of the through hole, where the upper housing is assembled on an upper side of the lower housing; and a fuse cover that is coupled to an upper side of the upper housing to cover the fuse exposed through the through hole of the upper housing.

The lower housing may include at least one of: a fuse seating portion in which the fuse is housed and seated; fuse fastening portions that are located at two sides of the fuse seating portion and are fastened with the fuse; a bus bar seating portion that is seated with bus bars respectively connected to both electrodes of the battery; a bus bar fastening portion that is fastened with one of the bus bars; or a first assembling hole that is assembled with the upper housing.

When the fuse is seated on the fuse seating portion, a gap having a predetermined length may be formed between at least one end of the fuse and an inner wall of the fuse seating portion.

A partition wall having a predetermined height may be arranged on at least one side of the bus bar seating portion.

The upper housing may include: a first coupling portion that is coupled to a battery upper case disposed around the through hole; and a second coupling portion that is coupled to the fuse cover disposed around the through hole.

The first coupling portion may include an insert nut folioed by injection molding, and a lower end surface thereof may include a positioning hole for adjusting a position of the insert nut at the time of the injection molding of the insert nut.

An inner side surface of the insert nut may include a thread, an inner bottom surface thereof may be closed, and an outer side surface thereof may be hatched.

The fuse box for a battery of a vehicle may further include: an upper housing seal that includes a plate-shaped main body that has a non-circular through hole folioed at a central portion thereof; a second extending portion that extends upwards to a predetermined height along a rim of the main body; and a protruding portion that has a predetermined area along the rim of the main body and protrudes on an upper surface of the main body, wherein the upper housing seal is coupled to an upper side of the upper housing.

The upper housing may have a second assembling hole, in which the upper housing seal is assembled, disposed around the first extending portion, and a first protruding portion may be disposed on a lower surface of the upper housing seal and may be assembled to the upper housing through the second assembling hole.

An inner side of the fuse cover may have an inner wall having a predetermined height and spaced from a circumference of the fuse cover, and a fuse cover seal may be arranged in a space between the circumference of the fuse cover and the inner wall and may be coupled to the first extending portion of the upper housing.

The fuse cover may be assembled with the fuse cover seal, and include a separation preventing assembling portion that prevents the fuse cover seal from being separated, and a second protruding portion may be disposed on one surface of the fuse cover seal and may be assembled with the separation preventing assembling portion.

The separation preventing assembling portion may include a third assembling hole, through which the second protruding portion is penetrated and assembled, and a separation preventing portion that prevents the second protruding portion from being separated, the second protruding portion may include a neck portion and a head portion that is disposed on an upper end of the neck portion and has a width narrowing from a lower end toward an upper end, and a width of the lower end of the head portion may be larger than a diameter of the third assembling hole, and the lower end of the head portion may be caught on an upper end of the separation preventing portion to prevent the second protruding portion from being separated.

The separation preventing portion may include a recess portion recessed from an upper surface of the fuse cover.

An outer surface of the inner wall of the fuse cover may include a plurality of concave portions, an inner surface of the fuse cover seal may include a third protruding portion inserted into one of the concave portions, and an outer surface thereof may include a tooth-shaped first locking portion, and an inner side surface of the first extending portion of the upper housing may include a tooth-shaped second locking portion.

The fuse cover may further include a third coupling portion that is coupled to the second coupling portion.

The fuse box for a battery of a vehicle may further include: a bus bar cover that covers one of the bus bars seated on the bus bar seating portion, in which the bus bar cover may be hinged to the lower housing to be opened and closed through a hinge.

The fuse box for a battery of a vehicle may further include: a main cover that covers the fuse cover and is made of a steel material.

DETAILED DESCRIPTION OF THE EMBODIMENTS

Figure 1:
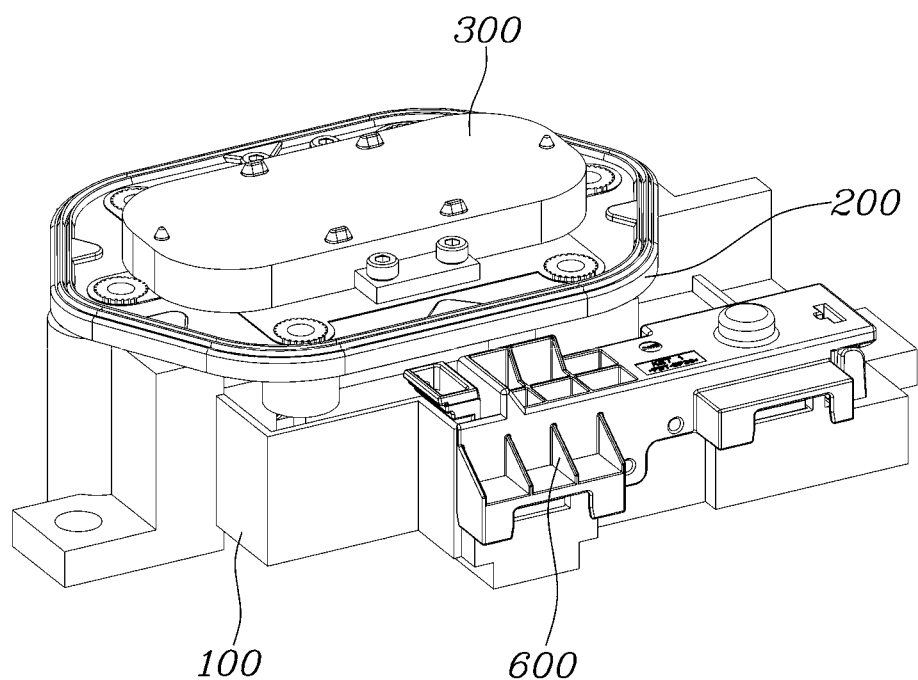
FIG. 1 is a diagram showing a fuse box for a battery of a vehicle according to an embodiment of the present disclosure.

Specific structural or functional descriptions will be provided only in order to describe various embodiments of the present disclosure disclosed herein. Therefore, embodiments of the present disclosure may be implemented in various forms, and the present disclosure is not to be interpreted as being limited to embodiments described herein.

Since embodiments of the present disclosure may be variously modified and may have several forms, specific embodiments will be shown in the accompanying drawings and will be described in detail in the present specification or disclosure. However, it is to be understood that the present disclosure is not limited to a specific embodiment, but includes all modifications, equivalents, and substitutions without departing from the scope and spirit of the present disclosure.

Terms such as 'first', 'second', or the like, may be used to describe various components, but these components are not to be construed as being limited to these terms. The terms are used only to distinguish one component from another component. For example, the 'first' component may be named the 'second' component and the 'second' component may also be similarly named the 'first' component, without departing from the scope of the present disclosure.

It is to be understood that when one element is referred to as being "connected to" or "coupled to" another element, it may be connected directly to or coupled directly to another element or be connected to or coupled to another element, having the other element intervening therebetween. On the other hand, it should be understood that when one element is referred to as being "connected directly to" or "coupled directly to" another element, it may be connected to or coupled to another element without the other element interposed therebetween. In addition, other expressions describing a relationship between components, that is, "between", "directly between", "neighboring to", "directly neighboring to" and the like, should be similarly interpreted.

Terms used in the present specification are used only in order to describe specific embodiments rather than limiting the present disclosure. Singular forms are intended to include plural forms unless the context clearly indicates otherwise. It will be further understood that the terms "comprises" or "have" used in this specification, specify the presence of stated features, steps, numerals, operations, components, parts, or a combination thereof, but do not preclude the presence or addition of one or more other features, numerals, steps, operations, components, parts, or a combination thereof.

Unless indicated otherwise, it is to be understood that all the terms used in the specification, including technical and scientific terms have the same meaning as those that are understood by those skilled in the art to which the present disclosure pertains. It should be understood that the terms defined by the dictionary are identical with the meanings within the context of the related art, and they should not be ideally or excessively formally defined unless the context clearly dictates otherwise.

Hereinafter, embodiments of the present disclosure will be described in detail with reference to the accompanying drawings. Like reference numerals proposed in each drawing denote like components.

Figure 2:
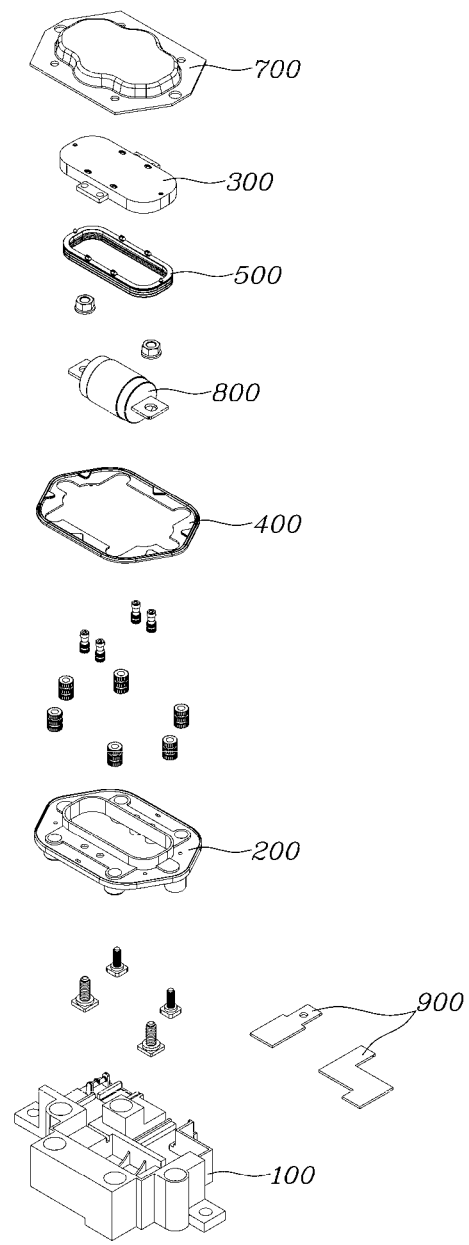
FIG. 2 is an exploded perspective view of the fuse box for a battery of a vehicle according to the embodiment of the present disclosure.

As shown in FIGS. 1 and 2, a fuse box for a battery of a vehicle according to an embodiment of the present disclosure may include a lower housing 100 provided with a space in which a fuse 800 is housed and a bus bar 900 for electrically connecting the battery and the fuse 800 is seated, a plate-shaped upper housing 200 that has a through hole folioed at a central portion thereof, includes a first extending portion 210 extending upward along a circumference of the through hole, and is assembled on an upper side of the lower housing 100, and a fuse cover 300 that is coupled to the upper side of the upper housing 200 to cover the fuse 800 exposed through the through hole of the upper housing 200, and may further include a main cover 700 that covers the fuse cover 300.

Figure 3:
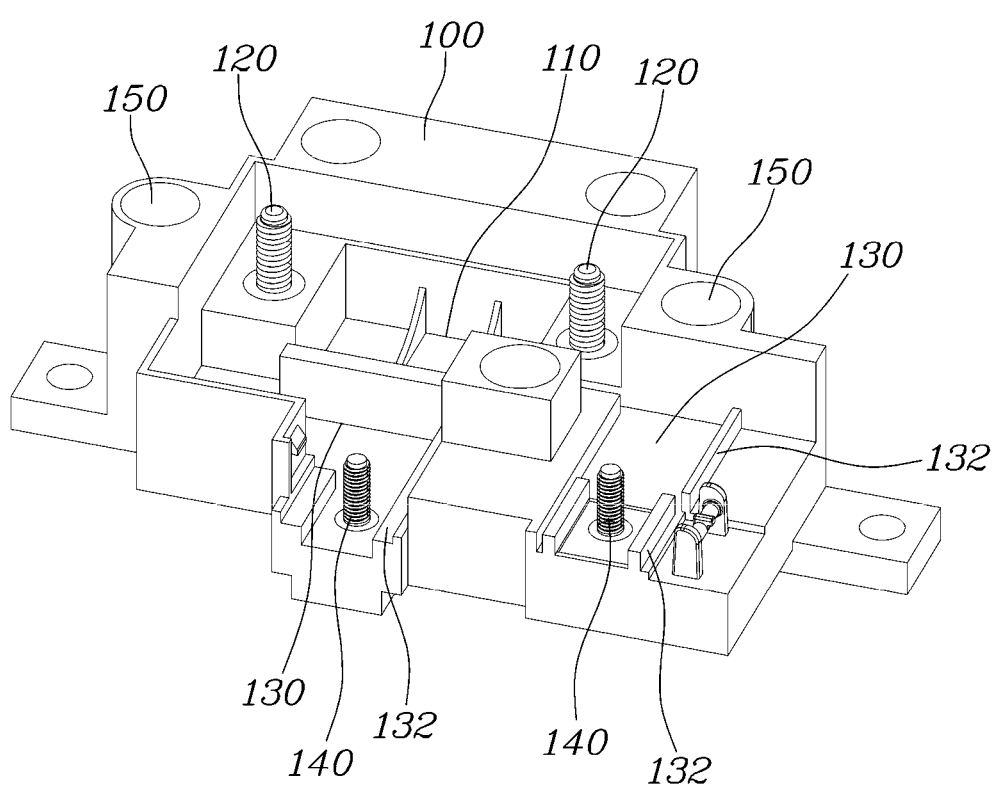
FIG. 3 is a diagram showing a lower housing of the fuse box for a battery of a vehicle according to the embodiment of the present disclosure.

Referring to FIG. 3, the lower housing 100 may be configured to include at least one of a fuse seating portion 110 in which the fuse 800 is housed and seated, fuse fastening portions 120 that are located at two opposing sides of the fuse seating portion 110 and are fastened with the fuse 800, a bus bar seating portion 130 that are seated with bus bars 900 each connected to both electrodes of the battery, a bus bar fastening portion 140 that is fastened with the bus bar 900, and a first assembling hole 150 that is assembled with the upper housing 200.

Specifically, the fuse seating portion 110 may be folioed such that when the fuse 800 is seated on the fuse seating portion 110, a gap (G) having a predetermined length is folioed between both ends of the fuse 800 and the inner wall of the fuse seating portion 110. According to the embodiment, when the fuse 800 is seated on the fuse seating portion 110, the gap (G) between both ends of the fuse 800 and the inner wall of the fuse seating portion 110 may be 1.5 mm.

As described above, when the fuse 800 is seated on the fuse seating portion 110, the fuse box according to the present disclosure may prevent the lower housing 100 from being fired when the fuse is heated by forming the gap (G) having the predetermined length between both ends of the fuse 800 and the inner wall of the fuse seating portion 110.

In addition, partition walls 132 having a predetermined height may be formed on at least one side of the bus bar seating portion 130. As described above, by forming the partition walls 132 having the predetermined height on the at least one side of the bus bar seating portion 130, the bus bar 900 may be more stably fixed to the bus bar seating portion 130 to maintain a layout of an initial state.

Figure 4:
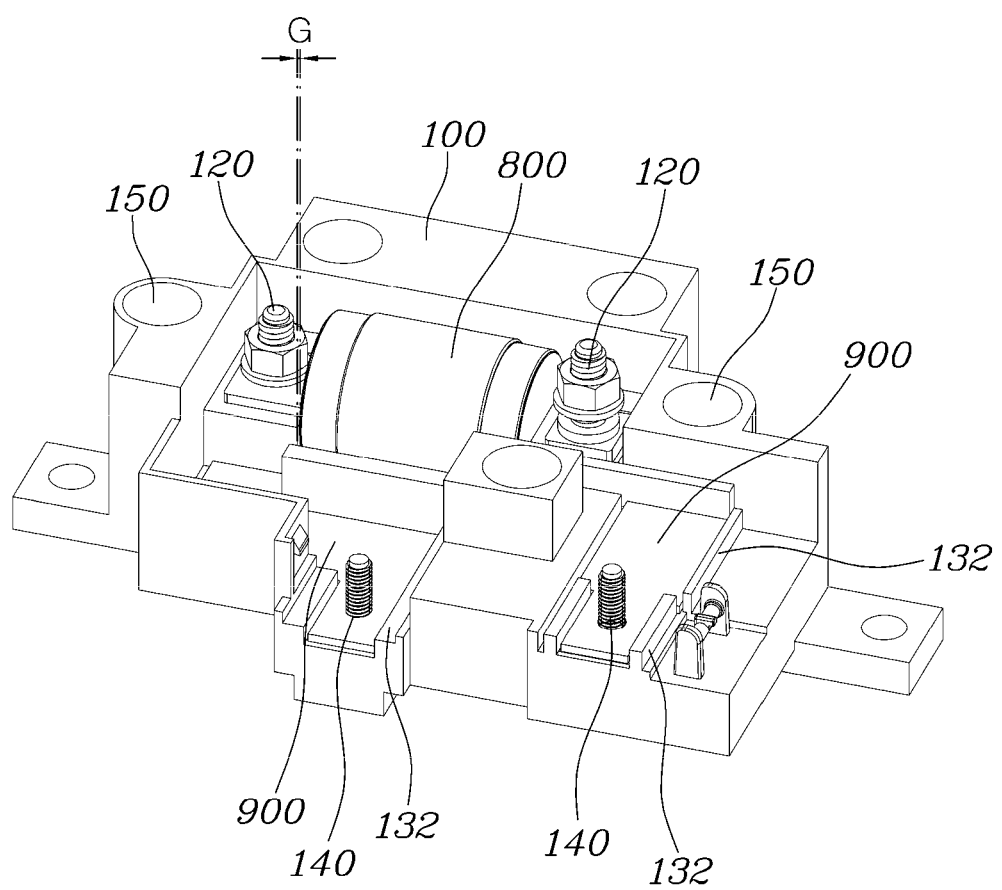
FIG. 4 is a diagram showing a state in which a fuse and a bus bar are seated in the lower housing of the fuse box for a battery of a vehicle according to the embodiment of the present disclosure.

Further, in the present disclosure, the fuse fastening portion 120 and the bus bar fastening portion 140 may be formed by being insert molded with a bolt. Referring to FIG. 4, both ends of the fuse 800 may be coupled to and fastened to the fuse fastening portion 120 that is insert injected with the bolt, and the bus bars 900 connected to both electrodes of the battery may be each fastened to the bus bar fastening portion 140.

Figure 5:
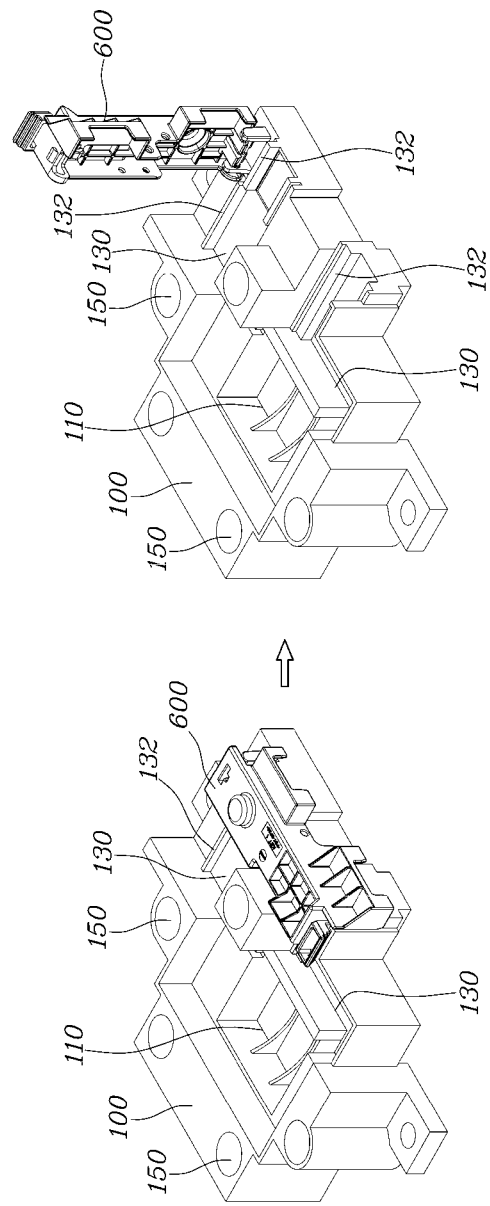
FIG. 5 is a diagram showing a state in which a bus bar cover coupled to the lower housing of the fuse box for a battery of a vehicle according to the embodiment of the present disclosure is opened and closed.

Referring to FIG. 5, the bus bar cover 600 may cover the bus bar 900 seated on the bus bar seating portion 130. Here, since the bus bar 900 is connected to a high voltage battery and the high voltage is conducted, a safety accident may occur when an operator's hand touches the bus bar 900 during the assembly or removal of the fuse 800 due to the failure of the fuse 800. In the present disclosure, by providing the bus bar cover 600, which covers the bus bar 900, in the lower housing 100, it is possible to prevent the safety accident that may occur when the operator's hand contacts the bus bar 900 during the assembly or removal of the fuse 800.

According to the embodiment, the bus bar cover 600 is hinged to the lower housing 100 as shown in FIG. 5, and as a result, the bus bar cover 600 may be opened and closed through the hinge.

Figure 6:
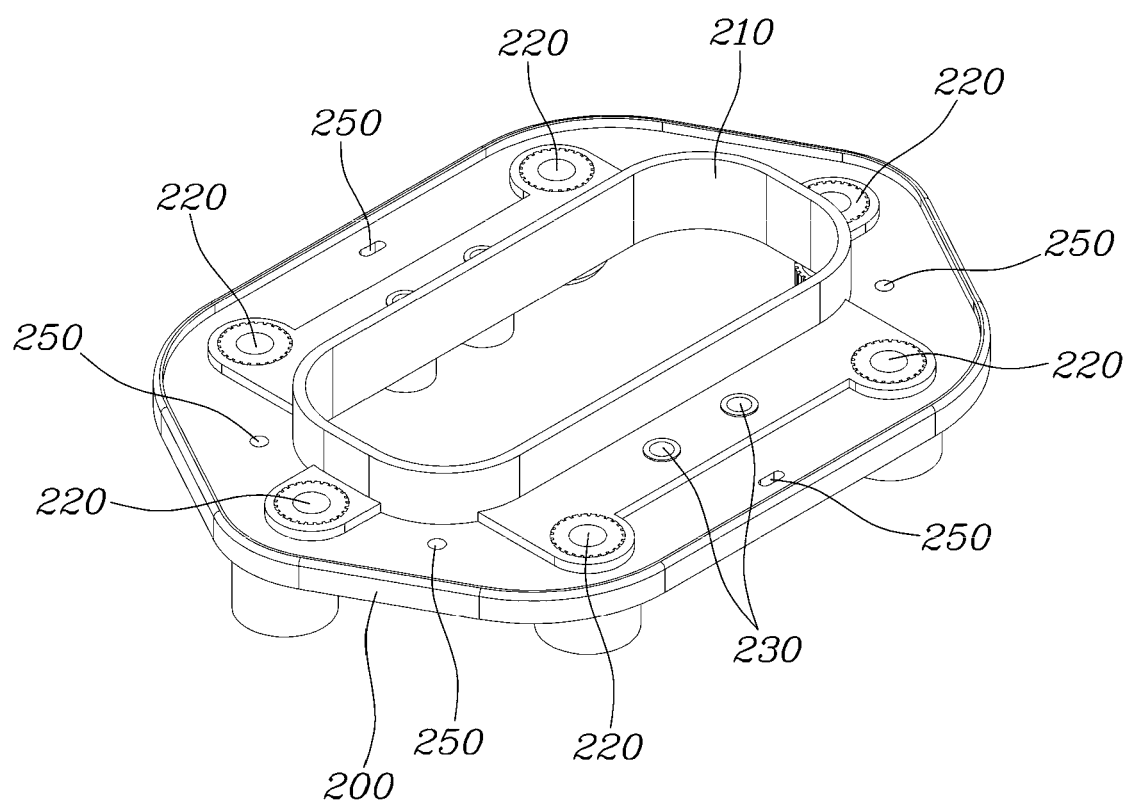
FIG. 6 is a diagram showing an upper housing of the fuse box for a battery of a vehicle according to the embodiment of the present disclosure.
Figure 11:
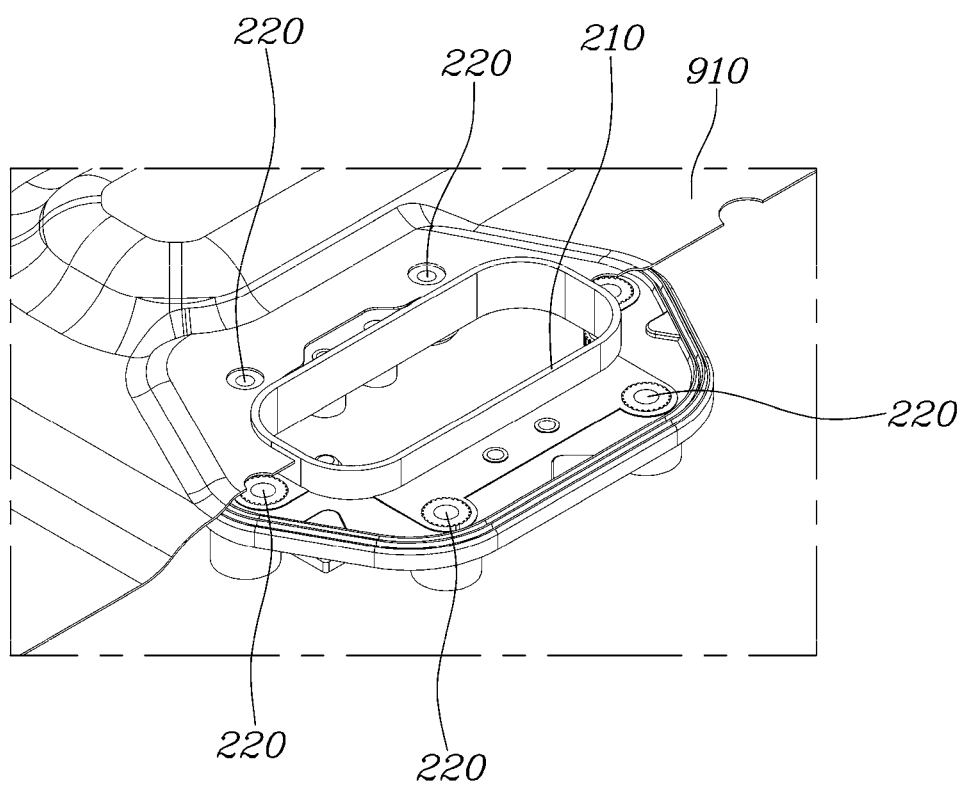
FIG. 11 is a diagram showing that the upper housing in which the upper housing seal is assembled in the fuse box for a battery of a vehicle according to the embodiment of the present disclosure is assembled in a battery upper case.

Referring to FIGS. 6 and 11, the upper housing 200 may include a first coupling portion 220, which is coupled to a battery upper case 910, provided around the through hole and a second coupling portion 230, which is coupled to the fuse cover 300, provided around the through hole. At this time, the upper housing 200 may be made of a plastic material that is an electrically non-conductive substance.

Here, the first coupling portion 220 that is coupled to the battery upper case 910 may be formed by being injection molded with an insert nut, and the second coupling portion 230 may be formed by being injection molded with the insert nut.

Figure 7:
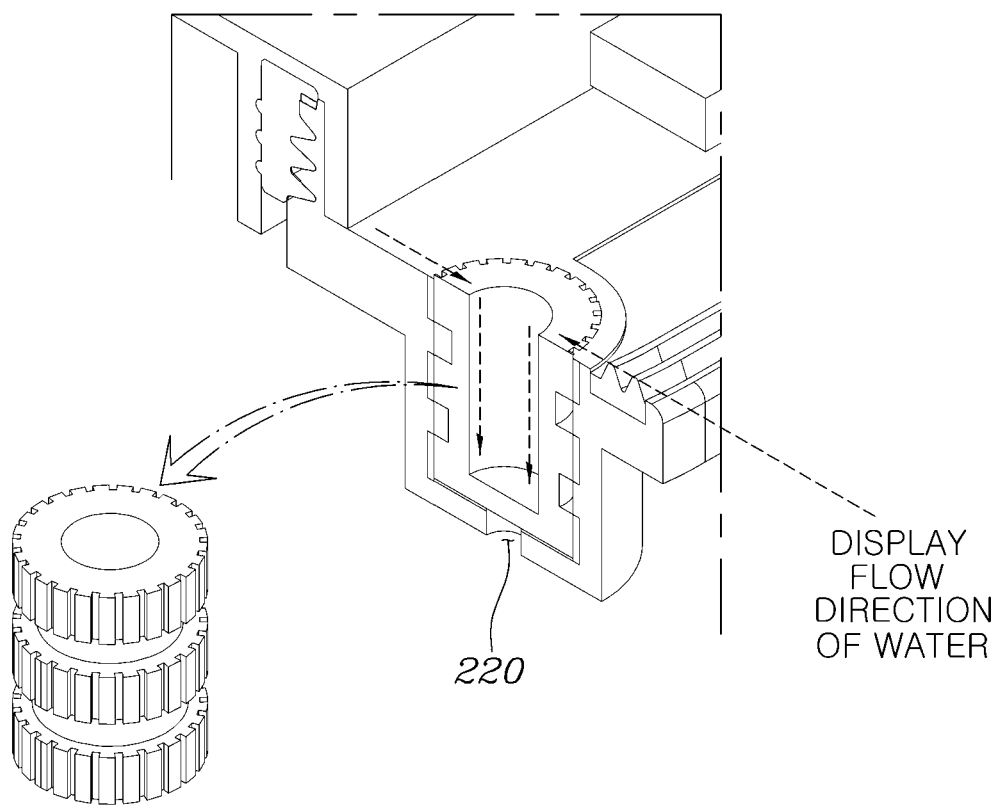
FIG. 7 is a diagram for describing a first coupling portion of the upper housing of the fuse box for a battery of a vehicle according to the embodiment of the present disclosure.

Referring to FIG. 7, the first coupling portion 220 will be described in detail, the first coupling portion 220 may be forted through the insert nut injection molding as described above, a lower end surface thereof may be provided with a positioning hole 222 for adjusting the position of the corresponding insert nut during the injection molding.

In addition, referring to FIG. 7, an inner side surface of the insert nut of the first coupling portion 220 may be provided with a thread, an inner bottom surface thereof may be closed, and an outer side surface thereof may be hatched.

On the other hand, referring to a flow indication of water indicated by a green arrow in FIG. 7, there may be a possibility of moisture inflow into the insert nut to which a bolt is coupled to the first coupling portion 220, and in the present disclosure, it is possible to prevent a moisture inflow problem by using the insert nut whose inner bottom surface is closed in order to block the moisture inflow problem.

In addition, by hatching the outer side surface of the insert nut, the injection molding material and the insert nut may be more rigidly molded when the insert is injected, thereby preventing moisture from entering the outer side surface of the insert nut.

Figure 8:
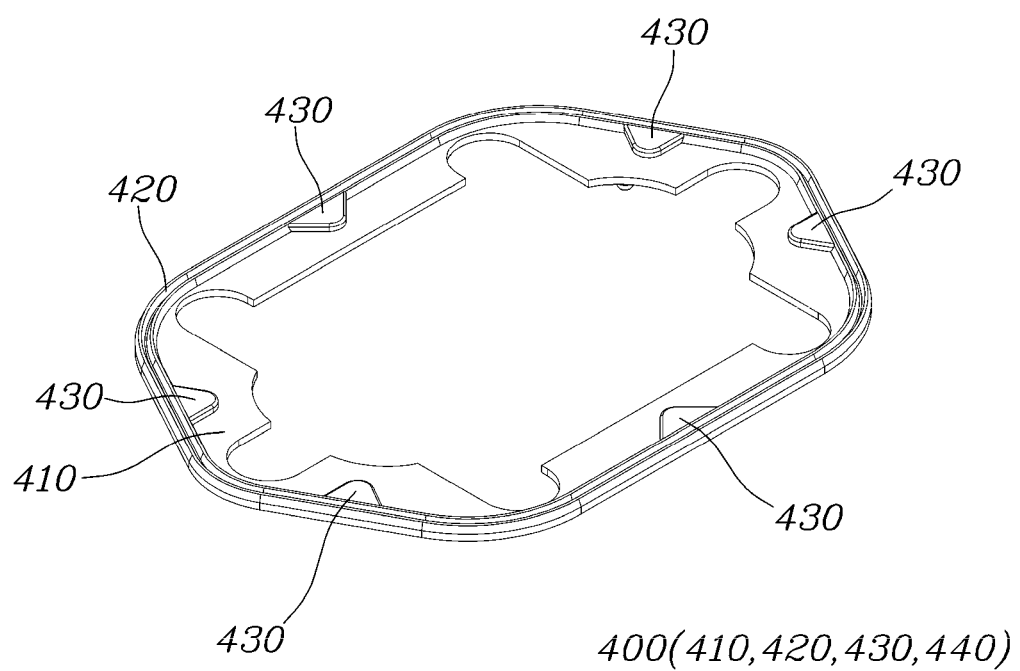
FIG. 8 is a diagram showing an upper surface of an upper housing seal of the fuse box for a battery of a vehicle according to the embodiment of the present disclosure.
Figure 9:
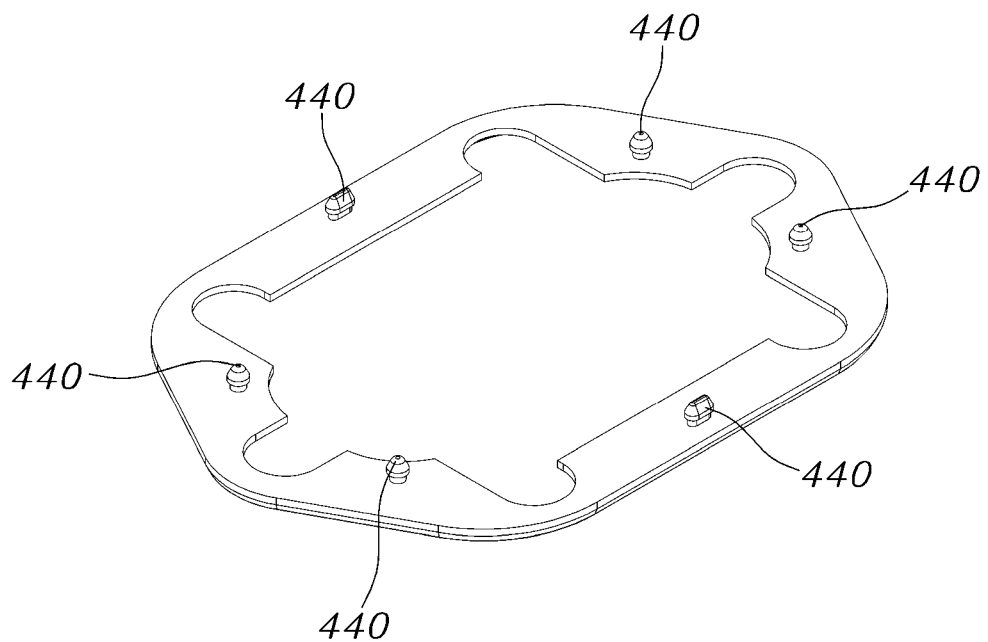
FIG. 9 is a diagram showing a lower surface of the upper housing seal of the fuse box for a battery of a vehicle according to the embodiment of the present disclosure.
Figure 10:
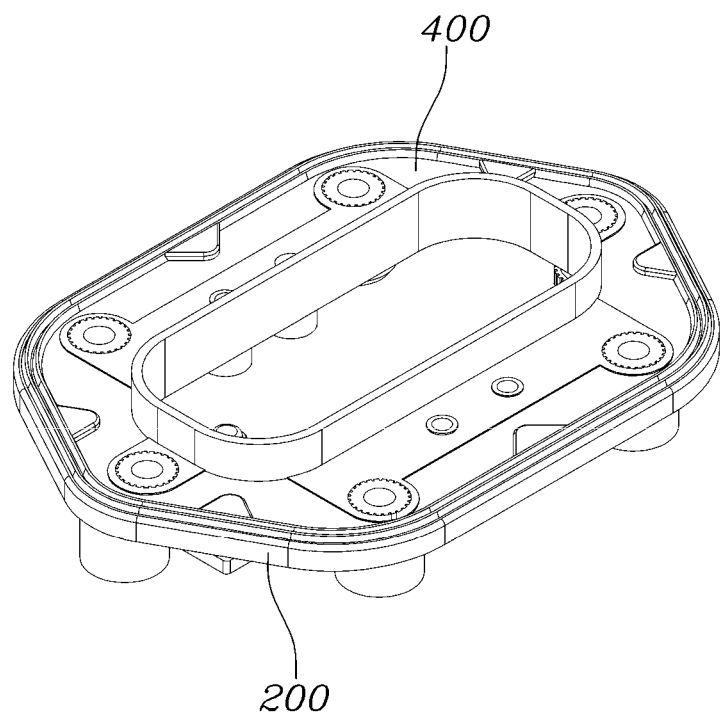
FIG. 10 is a diagram showing that the upper housing seal is assembled in the upper housing of the fuse box for a battery of a vehicle according to the embodiment of the present disclosure.

Referring to FIGS. 8 and 9, an upper housing seal 400 coupled to the upper side of the upper housing 200 may include a plate-shaped main body 410 that has a non-circular through hole formed at a central portion thereof, a second extending portion 420 that extends to a predetermined height upwards along a rim of the main body, and a protruding portion 430 that has a predetermined area along the rim of the main body and protrudes on an upper surface of the main body. At this time, the upper housing seal 400 may be made of a rubber material.

Specifically, referring to FIG. 11, the upper housing seal 400 is coupled to the upper side of the upper housing 200 to serve as a watertight surface of the inner surface of the battery upper case 910.

More specifically, as described above, the upper housing seal 400 has a plurality of protruding portion 430 that have a predetermined area along the rim of the main body and protrude from the upper surface of the main body to increase a contact area with the battery upper case 910, thereby increasing the watertight performance.

In addition, the upper housing seal 400 according to the present disclosure includes a second extending portion 420 extending upwards to a predetermined height along the rim of the main body to increase the contact area with the battery upper case 910, thereby preventing water from entering the inner side of the battery pack.

Further, referring to FIG. 6, the upper housing seal 400 may include the second assembling hole 250, in which the upper housing seal 400 is assembled, provided around the first extending portion 210, and referring to FIG. 9, the lower surface of the upper housing seal 400 may be provided with a first protruding portion 440 that is assembled in the second assembling hole 250. That is, the first protruding portion 440 folioed on the lower surface of the upper housing seal 400 is coupled to the second assembling hole 250 folioed in the upper housing 200, and as a result, may be coupled to the upper side of the upper housing 200 of the upper housing seal 400.

Figure 12:
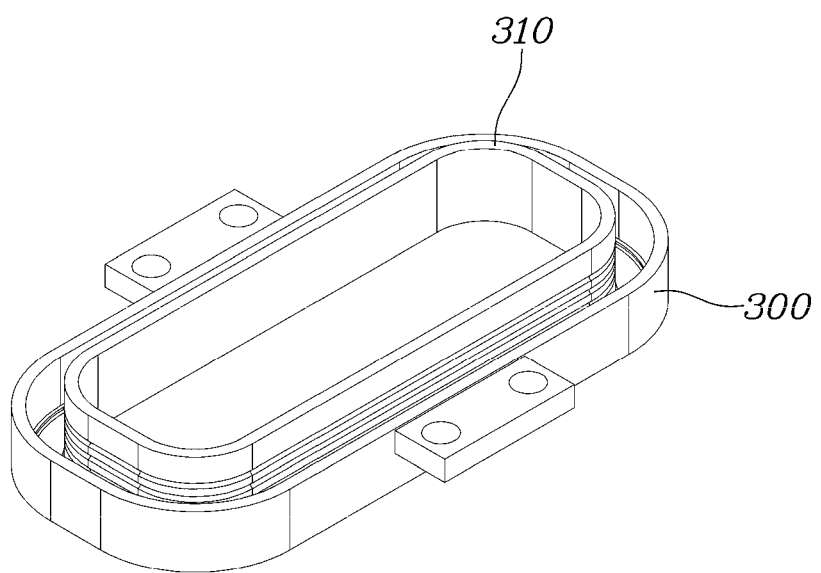
FIG. 12 is a diagram showing a fuse cover of the fuse box for a battery of a vehicle according to the embodiment of the present disclosure.
Figure 13:
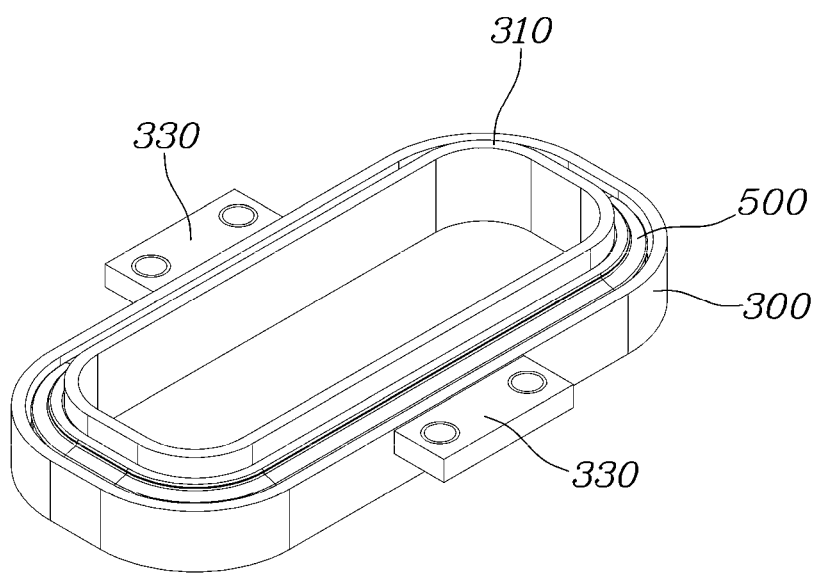
FIG. 13 is a diagram showing that a fuse cover seal is assembled in the fuse cover of the fuse box for a battery of a vehicle according to the embodiment of the present disclosure.

Referring to FIG. 12, the fuse cover 300 may be provided with an inner wall 310 that has a predetermined height and spaced at a predetermined distance along the circumference of the fuse cover 300. As described above, as shown in FIGS. 13 and 14, the fuse cover seal 500 and the first extending portion 210 of the upper housing 200 may be inserted into the space between the fuse cover 300 and the inner wall 310 and coupled.

Figure 14:
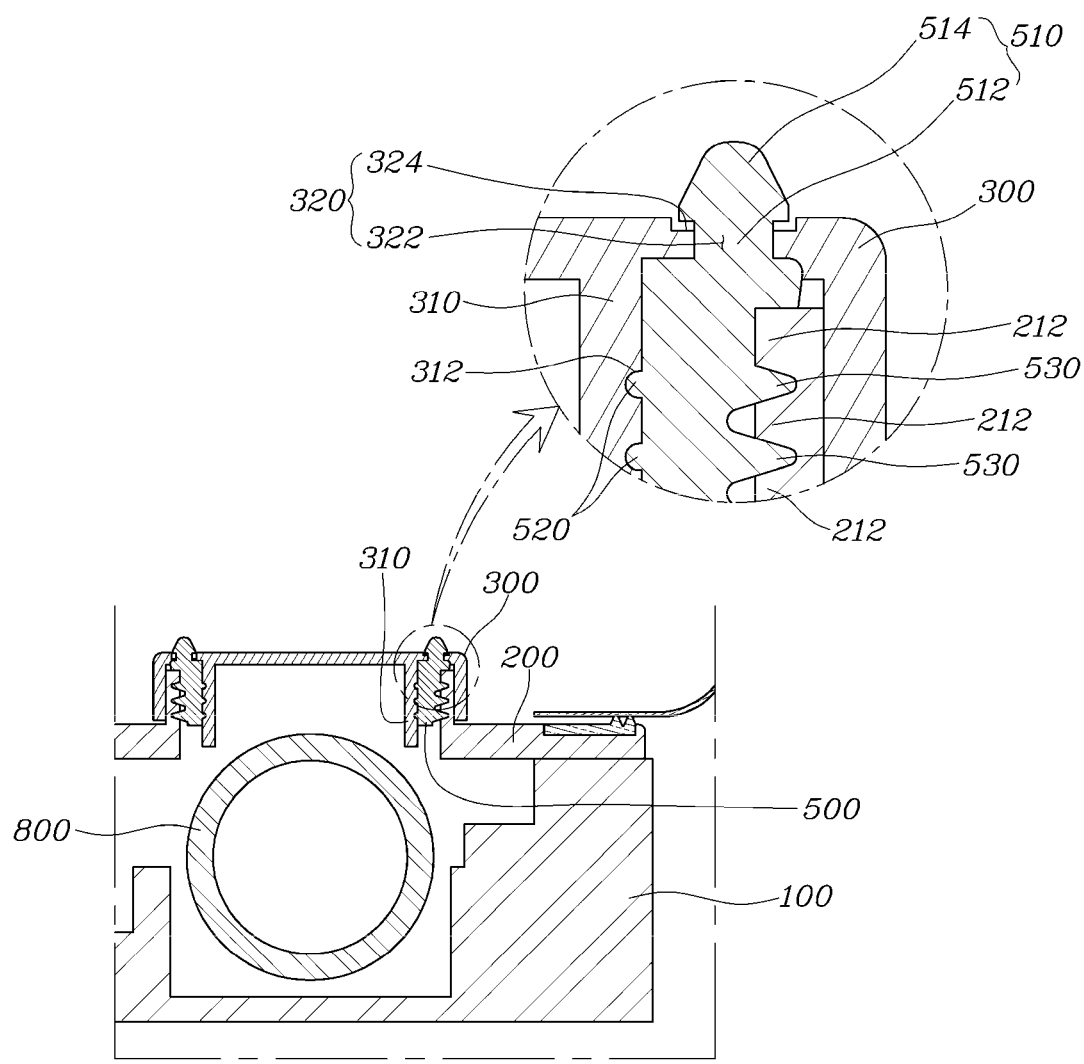
FIG. 14 is a diagram for describing a coupling relationship of the fuse cover, the fuse cover seal, and the upper housing in the fuse box for a battery of a vehicle according to an embodiment of the present disclosure.

Describing the coupling relationship of the upper housing 200, the fuse cover 300, and the fuse cover seal 500 with reference to FIG. 14, the fuse cover 300 may be assembled with the fuse cover seal 500 and may be provided with a separation preventing assembling portion 320 that prevents the fuse cover seal 500 from being separated, and one surface of the fuse cover seal 500 may be provided with a second protruding portion 510 that is assembled with the separation preventing assembling portion 320.

More specifically, referring to each component, the separation preventing assembling portion 320 may include a third assembling hole 322, through which the second protruding portion 510 is penetrated and assembled, and a separation preventing portion 324 that prevents the second protruding portion 510 from being separated. In one embodiment, the separation preventing portion 324 may include a recess portion recessed from an upper surface of the fuse cover 300.

In addition, the second protruding portion 510 may include a neck portion 512 and a head portion 514 that is formed on an upper end of the neck portion 512 and has an area (or width) narrowing from a lower end toward the upper end. According to the embodiment, the head portion 514 may be formed in a triangular shape as shown in FIG. 14. According to the embodiment, the fuse cover seal 500 may be made of an elastic rubber material.

On the other hand, a width of a lower end of the head portion 514 may be formed larger than a diameter of the third assembling hole 322, and the neck portion 512 is preferably folioed to be equal to or less than the diameter of the third assembling hole 322. That is, the neck portion is formed to be equal to or less than a diameter of the third assembling hole, the width of the lower end of the head portion is formed to be larger than the diameter of the third assembling hole, and as a result, when the second protruding portion is coupled to the separation preventing assembly as shown in FIG. 14, the lower end of the head portion is caught on the upper end of the separation preventing portion, thereby preventing the fuse cover seal 500 from being separated from the fuse cover.

In addition, referring to FIG. 14, a plurality of concave portions 312 may be provided on the outer surface of the inner wall 310 of the fuse cover 300, an inner surface of the fuse cover seal 500 may be provided with the third protruding portion 520 inserted into the concave portion 312, and an outer surface thereof may be provided with a first locking portion 530 having a tooth shape. In addition, an inner side surface of the first extending portion 210 of the upper housing 200 may be provided with a second locking portion 212 having a tooth shape.

Further, the fuse cover 300 may further include a third coupling portion 330 for coupling to the second coupling portion 230 of the upper housing 200. Here, the third coupling portion 330 may be implemented by assembling a bush in a hole formed in a side mounting portion of the fuse cover.

When the fuse cover is assembled with the upper housing 200, if the hole formed in the side mounting portion of the fuse cover is tightened by a bolt with a force of a predetermined magnitude or more, a problem may occur that the side mounting portion of the fuse cover may be damaged. In the present disclosure, in order to prevent such a problem, by providing the third coupling portion 330 in which the bush for coupling with the upper housing 200 is assembled in the fuse cover 300, the fuse cover 300 can be more stably assembled with the upper housing 200 without damaging the side mounting portion of the fuse cover 300.

Figure 16:
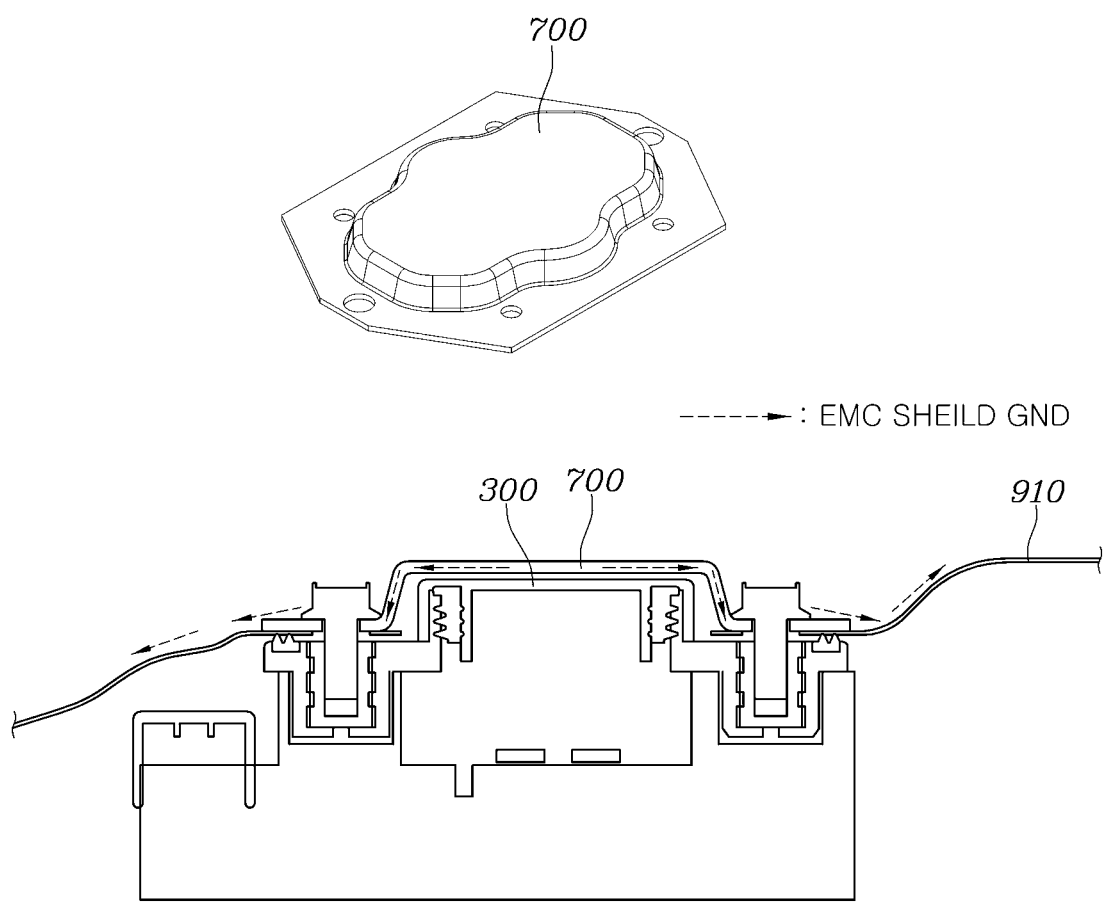
FIG. 16 is a diagram for describing that electromagnetic waves are shielded in the fuse box for a battery of a vehicle according to the embodiment of the present disclosure.

The main cover 700 covers the fuse cover 300 and may be made of steel. Referring to FIG. 16, by using the main cover 700 made of the steel material covering the fuse cover 300, the rigidity can be secured from external impact, and at the same time, electromagnetic waves can be conducted along the battery case to be drawn to the ground, thereby shielding the electromagnetic waves.

Figure 15:
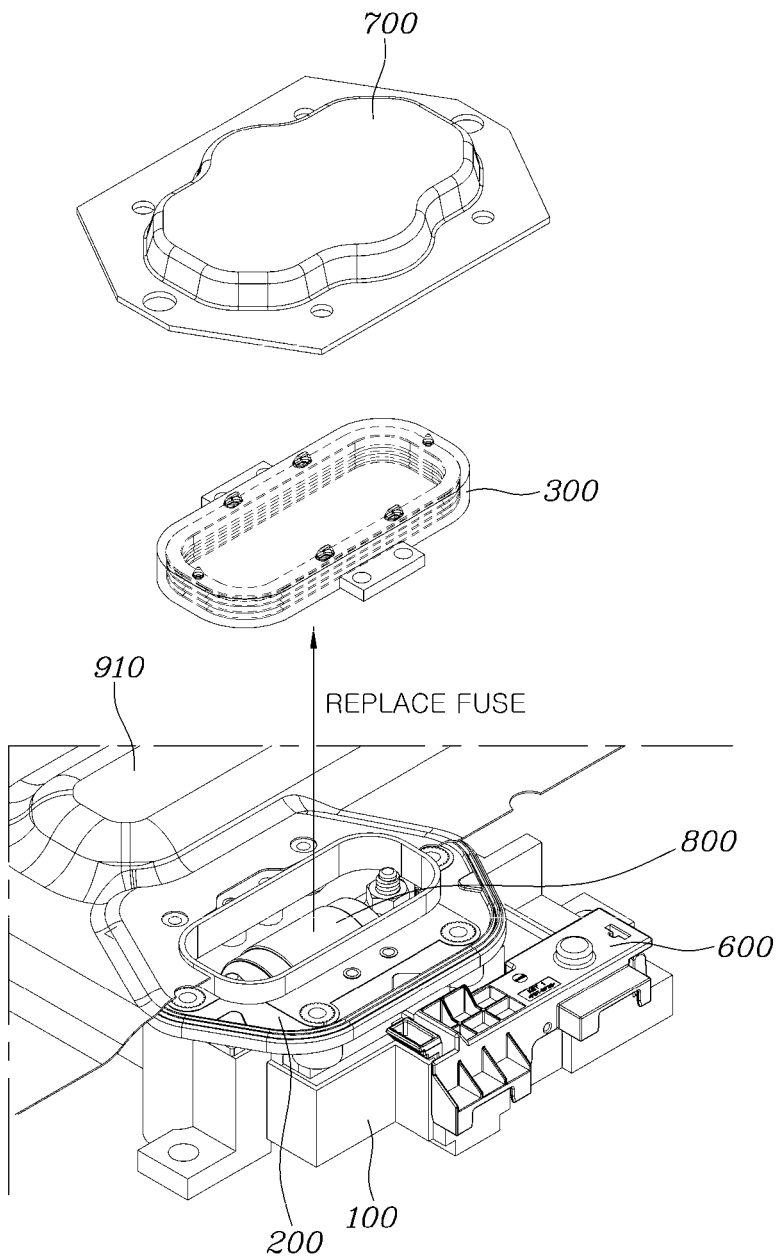
FIG. 15 is a diagram for describing a process of replacing a fuse in the fuse box for a battery of a vehicle according to the embodiment of the present disclosure.

When the fuse 800 fails or needs to be inspected in the fuse box for a battery of a vehicle according to the present disclosure having the structural features as described above, as shown in FIG. 15, the main cover 700 and the fuse cover 300 are removed, and thus the fuse 800 may be inspected or replaced.

Figure 17:
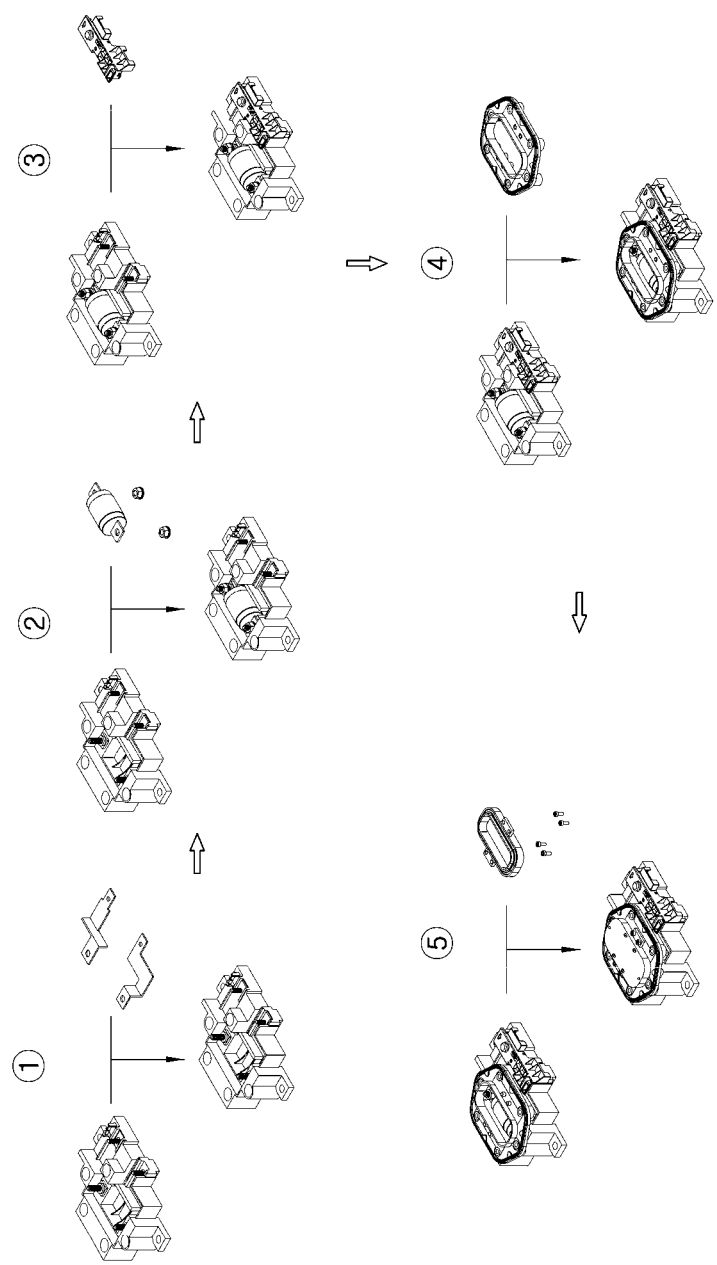
FIG. 17 is a diagram for describing a process of assembling of the fuse box for a battery of a vehicle according to the embodiment of the present disclosure.

FIG. 17 is a diagram for describing a process of assembling of the fuse box for a battery of a vehicle according to the embodiment of the present disclosure. Referring to FIG. 17, describing the process of assembling the fuse box for a battery of a vehicle according to the present disclosure, the bus bar 900 is seated on the bus bar seating portion 130 of the lower housing 100, the fuse 800 is seated on the fuse seating portion 110, and then the bus bar fastening portion and the fuse fastening portion are fastened with a nut, thereby fixing the bus bar 900 and the fuse 800 to the lower housing 100. Thereafter, the bus bar cover 600 is coupled to the lower housing 100 by the hinge coupling to cover the bus bar 900, and then the upper housing 200 coupled to the upper housing seal 400 is coupled to the upper side of the lower housing 100. Thereafter, the fuse box for a battery of a vehicle may be assembled through the process of coupling the fuse cover 300 with which the fuse cover seal 500 is coupled to the upper side of the upper housing 200.

The main cover not shown in detail in FIG. 17 may couple the fuse box assembled through the fixing of to the battery case and then to the upper side of the fuse cover 300.

In the fuse box according to the present disclosure, when the fuse 800 is seated on the fuse seating portion 110, a gap having a predetermined length is formed between both ends of the fuse and the inner wall of the fuse seating portion 110, thereby preventing the lower housing 100 from being fired when the fuse 800 is heated.

In the present disclosure, by providing the bus bar cover 600, which covers the bus bar 900, in the lower housing 100, it is possible to prevent the safety accident that may occur when the operator's hand contacts the bus bar 900 during the assembly or removal of the fuse 800.

In the present disclosure, by using the main cover made of a steel material covering the fuse cover 300, the rigidity can be secured from external impact, and at the same time, electromagnetic waves can be conducted along the battery case to be drawn to the ground, thereby shielding the electromagnetic waves.

Although the present disclosure has been shown and described with respect to specific embodiments, it will be apparent to those having ordinary skill in the art that the present disclosure may be variously modified and altered without departing from the spirit and scope of the present disclosure as defined by the following claims.

What is claimed is:

1. A fuse box for a battery of a vehicle, comprising:
    a lower housing having a space in which a fuse is housed and a bus bar for electrically connecting the battery and the fuse is seated, the lower housing including a bus bar seating portion that is seated with bus bars respectively connected to both electrodes of the battery;
    a plate-shaped upper housing having a through hole formed at a central portion thereof and a first extending portion extending upward along a circumference of the through hole, the upper housing being assembled on an upper side of the lower housing, the fuse being exposed through the through hole of the upper housing;
    a fuse cover that is coupled to an upper side of the upper housing to cover the fuse exposed through the through hole of the upper housing; and
    a bus bar cover that covers one of the bus bars seated on the bus bar seating portion,
    wherein the bus bar cover is hinged to the lower housing to be opened and closed through a hinge.

2. The fuse box of claim 1, wherein the lower housing further includes at least one of:
    a fuse seating portion in which the fuse is housed and seated;
    fuse fastening portions that are located at two sides of the fuse seating portion and are fastened with the fuse;
    a bus bar fastening portion that is fastened with one of the bus bars; or
    a first assembling hole that is assembled with the upper housing.

3. The fuse box of claim 2, wherein when the fuse is seated on the fuse seating portion, a gap having a predetermined length is formed between at least one end of the fuse and an inner wall of the fuse seating portion.

4. The fuse box of claim 2, wherein a partition wall having a predetermined height is arranged on at least one side of the bus bar seating portion.

5. The fuse box of claim 1, wherein the upper housing includes:
    a first coupling portion that is coupled to a battery upper case disposed around the through hole; and
    a second coupling portion that is coupled to the fuse cover disposed around the through hole.

6. The fuse box of claim 5, wherein the first coupling portion includes an insert nut formed by injection molding, and a lower end surface thereof includes a positioning hole for adjusting a position of the insert nut at the time of the injection molding of the insert nut.

7. The fuse box of claim 6, wherein an inner side surface of the insert nut includes a thread, an inner bottom surface thereof is closed, and an outer side surface thereof is hatched.

8. The fuse box of claim 5, further comprising an upper housing seal that includes a plate-shaped main body that has a non-circular through hole formed at a central portion thereof; a second extending portion that extends upwards to a predetermined height along a rim of the main body; and a protruding portion that has a predetermined area along the rim of the main body and protrudes on an upper surface of the main body,
    wherein the upper housing seal is coupled to an upper side of the upper housing.

9. The fuse box of claim 8, wherein the upper housing has a second assembling hole, in which the upper housing seal is assembled, disposed around the first extending portion, and
    a first protruding portion is disposed on a lower surface of the upper housing seal and is assembled to the upper housing through the second assembling hole.

10. The fuse box of claim 1, wherein an inner side of the fuse cover has an inner wall having a predetermined height and being spaced from a circumference of the fuse cover, and
    a fuse cover seal is arranged in a space between the circumference of the fuse cover and the inner wall and coupled to the first extending portion of the upper housing.

11. The fuse box of claim 10, wherein the fuse cover is assembled with the fuse cover seal, and includes a separation preventing assembling portion that prevents the fuse cover seal from being separated, and
    a second protruding portion is disposed on one surface of the fuse cover seal and is assembled with the separation preventing assembling portion.

12. The fuse box of claim 11, wherein the separation preventing assembling portion includes a third assembling hole, through which the second protruding portion is penetrated and assembled, and a separation preventing portion that prevents the second protruding portion from being separated,
    the second protruding portion includes a neck portion and a head portion that is disposed on an upper end of the neck portion and has a width narrowing from a lower end toward an upper end, and
    a width of the lower end of the head portion is larger than a diameter of the third assembling hole, and the lower end of the head portion is caught on an upper end of the separation preventing portion to prevent the second protruding portion from being separated.

13. The fuse box of claim 12, wherein the separation preventing portion includes a recess portion recessed from an upper surface of the fuse cover.

14. The fuse box of claim 10, wherein an outer surface of the inner wall of the fuse cover includes a plurality of concave portions,
    an inner surface of the fuse cover seal includes a third protruding portion inserted into one of the concave portions, and an outer surface thereof includes a tooth-shaped first locking portion, and an inner side surface of the first extending portion of the upper housing includes a tooth-shaped second locking portion.

15. The fuse box of claim 5, wherein the fuse cover further includes a third coupling portion that is coupled to the second coupling portion.

16. The fuse box of claim 1, further comprising:
a main cover that covers the fuse cover and is made of a steel material.

* * * * *